(12) United States Patent
Misra et al.

(10) Patent No.: US 9,785,498 B2
(45) Date of Patent: Oct. 10, 2017

(54) ARCHIVAL STORAGE AND RETRIEVAL SYSTEM

(75) Inventors: Prateep Misra, Kolkata (IN); Nilanjan Roy, Kolkata (IN); Soumitra Naskar, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 875 days.

(21) Appl. No.: 14/113,806

(22) PCT Filed: Jun. 17, 2011

(86) PCT No.: PCT/IN2011/000408
§ 371 (c)(1),
(2), (4) Date: Oct. 24, 2013

(87) PCT Pub. No.: WO2012/147087
PCT Pub. Date: Nov. 1, 2012

(65) Prior Publication Data
US 2014/0052706 A1    Feb. 20, 2014

(30) Foreign Application Priority Data

Apr. 29, 2011    (IN) .......................... 1360/MUM/2011

(51) Int. Cl.
*G06F 17/00*    (2006.01)
*G06F 17/30*    (2006.01)
(Continued)

(52) U.S. Cl.
CPC ...... *G06F 11/1004* (2013.01); *G06F 11/1092* (2013.01); *G06F 11/3034* (2013.01);
(Continued)

(58) Field of Classification Search
CPC ......... G06F 17/30097; G06F 17/30194; G06F 17/30209; G06F 17/30073
See application file for complete search history.

(56) References Cited

U.S. PATENT DOCUMENTS 7,065,618 B1 * 6/2006 Ghemawat ........ G06F 17/30215
707/999.201
7,516,354 B2    4/2009 Nguyen et al.
(Continued)

OTHER PUBLICATIONS

Dimakis et al., "Network Coding for Distributed Storage Systems," IEEE Transactions on Information Theory, vol. 56, No. 9, pp. 4539-4551 (Sep. 2010).
(Continued)

*Primary Examiner* — Kannan Shanmugasundaram
(74) *Attorney, Agent, or Firm* — Finnegan, Henderson, Farabow, Garrett & Dunner LLP

(57) ABSTRACT

A highly reliable data archival and retrieval method that enables fine grained control over data availability is implemented across a Quality of Service driven archival system, configured to fragment the data into data and parity chunks for storing onto the storage node. The technique employed by the archival system enables files to be read without having need to access any metadata, thereby tolerating complete loss of such metadata. Further, the Quality of Service driven system architecture improves upon the system performance and throughput by means of a storage node regeneration process which ensures balanced load on participating storage node during various storage, retrieval and regeneration operations.

14 Claims, 5 Drawing Sheets

(51) Int. Cl.
*G06F 11/10* (2006.01)
*G06F 11/30* (2006.01)
*G06F 7/00* (2006.01)

(52) U.S. Cl.
CPC .... *G06F 11/3055* (2013.01); *G06F 17/30073* (2013.01); *G06F 17/30097* (2013.01); *G06F 17/30194* (2013.01); *G06F 17/30209* (2013.01)

(56) References Cited

U.S. PATENT DOCUMENTS

| | | |
|---|---|---|
| 7,627,617 B2 | 12/2009 | Kavuri et al. |
| 8,468,244 B2 | 6/2013 | Redlich et al. |
| 2002/0124137 A1 | 9/2002 | Ulrich et al. |
| 2003/0120723 A1 | 6/2003 | Bright et al. |
| 2004/0133577 A1* | 7/2004 | Miloushev ......... G06F 11/1076 |
| 2006/0041718 A1 | 2/2006 | Ulrich et al. |
| 2007/0113032 A1* | 5/2007 | Kameyama ......... G06F 11/1076 711/162 |
| 2008/0221856 A1* | 9/2008 | Dubnicki .............. G06F 3/0608 703/21 |
| 2008/0282105 A1* | 11/2008 | Deenadhayalan .. G06F 11/1076 714/6.12 |
| 2009/0013129 A1 | 1/2009 | Bondurant |
| 2009/0254572 A1 | 10/2009 | Redlich et al. |
| 2010/0037056 A1 | 2/2010 | Follis et al. |
| 2010/0064166 A1 | 3/2010 | Dubnicki et al. |
| 2010/0199123 A1 | 8/2010 | Cohen |
| 2010/0332401 A1 | 12/2010 | Prahlad et al. |

OTHER PUBLICATIONS

Gaidioz et al., "Exploring High Performance Distributed File Storage Using LDPC Codes," Parallel Computing, vol. 33, iss. 4-5, pp. 264-274 (May 2007).

Chiueh, "Challenges of Long-Term Digital Archiving: A Survey," available at http://www.ecsl.cs.sunysb.edu/tr/rpe19.pdf (Aug. 3, 2010) (earliest known date).

International Search Report mailed on Dec. 5, 2011, in International Application No. PCT/IN2011/000408.

* cited by examiner

ARCHIVAL STORAGE AND RETRIEVAL SYSTEM

CROSS-REFERENCE TO RELATED PATENT APPLICATIONS

This application is a National Stage Entry of International Application No. PCT/IN2011/000408, filed Jun. 17, 2011, which claims priority from Indian Patent Application No. 1360/MUM/2011, filed Apr. 29, 2011. The entire contents of the above-referenced applications are expressly incorporated herein by reference.

FIELD OF THE INVENTION

The present invention relates generally to the field of data storage and retrieval and more particularly, relates to a reliable, Quality of Service driven archival storage system capable of storing files added to archive with their integrity intact.

BACKGROUND OF THE INVENTION

In this era of stringent regulatory and compliance requirements, there is an ever increasing need of storage capacity for storage of digital archives and historical data-digital preservation. Unstructured data such as documents, images, emails, multimedia etc. need to be stored for retrieval and analysis at a later date. In a large organization, such data can easily be of the order of few hundred terabytes to petabytes level. There is a clear trend towards use of disks for storage of archives. These disk based archives provides the advantage of random and faster access to required files; offers large capacities and bandwidth at low costs and it is possible to proactively check and maintain the integrity of the archives when using disks.

However, the major technical challenges in creating a large disk based storage archive are:

Availing large capacity at low costs remains a major challenge where hundreds of terabytes/tens of petabytes of data storage is required.

The ability of the archives to deliver large read and write throughput with continuous addition of files to the archive system on a daily basis or their retrieval from the system on being queried still poses a major challenge.

Further, archives are required to be stored for a considerably long period of time. In such a case, it is obvious that periodically the hardware and operating system will have to be refreshed. The challenge herein, lies with automatic and transparent migration of data to the refreshed hardware as and when the changes are made in the infrastructure.

Lastly, data integrity is a critical issue which requires data to be stored in the archival system without any loss and with their integrity intact throughout the lifetime of the archive.

US Patent Application US20100199123 presents a system, method and a computer program which replaces a failed node storing data relating to a portion of a data file. An indication of a new storage node to replace the failed node is received at each of a plurality of available storage nodes. The available storage nodes each contain a plurality of shares generated from a data file. These shares may have been generated based on pieces of the data file using erasure coding techniques. A replacement share is generated at each of the plurality of available storage nodes. These replacement shares may later be used to reconstruct the data file.

US Patent Application US20100064166 shows an exemplary system and method providing a plurality of data services by employing splittable, mergable and transferable redundant chains of data containers. The chains and containers may be automatically split and/or merged in response to changes in storage node network configurations and may be stored in erasure coded fragments distributed across different storage nodes. Data services provided in a distributed secondary storage system utilizing redundant chains of containers may include global de-duplication, dynamic scalability, support for multiple redundancy classes, data location, fast reading and writing of data and rebuilding of data due to node or disk failures.

However, the above cited prior arts do not provide any granular control of QoS to individual files stored in the system and neither does it provide any mechanism to automate self repair and reconstruction of failed nodes to improve system performance. This adversely impacts the scalability, throughput time and instant data availability from the archival systems.

What is needed, therefore, is a system to addresses the above stated technical problems of the prior art and to this end, the present invention proposes a novel system and method which introduces a reliability parameter indicative of QoS levels provided to each file which allows granular file level control on the protection given to a file with respect to data loss in the event of hardware failure and improvise overall performance of the system by making it more responsive and reliable. What is also needed is a data archival system and method that ensures data integrity and provides an increased data transfer bandwidth between the user and the archival system.

OBJECT OF THE INVENTION

In accordance with the present invention, an archival storage and retrieval system that enables fine grained control over the data availability is provided.

It is an object of the present invention to provide a cost effective archival storage system by creating a large cluster of shared nothing storage nodes.

Another objective of the present invention is to ensure data availability and quick reading of erasure coded files from the archival system by an intelligent file coding and chunk placement technique that avoids the requirement of meta-data lookup during file access.

It is an object of the invention to use horizontal scalability, load balancing and intelligent I/O scheduling techniques to improve system performance.

One of the other objectives of the present invention is to provide a system for the archival storage specific workload.

Yet another objective of the present invention is to enable the system to ensure quick rebuild and repair of failed or degraded nodes in the event of hardware failure by regeneration mechanism.

In accordance with one aspect of the invention, a scheme of parallel node regeneration process is provided which ensures a balanced I/O operation on all nodes participating in the file regeneration process.

In another aspect of the present invention, a system allowing files to be read from the archive without the need to access any metadata is provided which is capable of tolerating complete loss of metadata.

Yet another aspect of the present invention provides a method by which metadata of all files stored in the archive can be partially restored in the event of complete loss of metadata.

In one of the aspect of the present invention, a system consuming less computational resources is provided which prevents the servers from being a bottleneck during file retrieval process.

In yet another aspect, a high read and write throughput delivering system is presented.

One of the main objectives of the present invention is to provide an archival system that prevents files added to the archive from losing their integrity during the entire life span of the archive.

It is another object of the present invention to present a system and method capable of maintaining archive service availability even when there are multiple storage node failures in the cluster.

It is another object of the present invention to present a system and method capable of maintaining data availability and data integrity even after storage node failures or in the event of data corruption or in case of complete loss of metadata.

One of the other major objectives is to present a self maintaining and self repairing system without requiring to be instructed for such an activity.

Another major objective of the present invention is to optimize read bandwidth occupancy of the system and avoid creation of hot spots during I/O operations and during rebuild of failed nodes.

SUMMARY OF THE INVENTION

The system and method in accordance with exemplary embodiments of the present invention provides a cost effective data archival and retrieval scheme that facilitates granular level control over data availability by associating Quality of Service (QoS) reliability parameter with each file added to the archive. Furthermore, exemplary system and method ensures data integrity throughout the life span of the archive. In particular, the QoS driven disk based system and method of the present invention defines availability index of a file as QoS value indicative of availability offered by the archival system for a file at any instance of time for ensured data availability, improved system performance and large throughput values.

In one exemplary embodiment of the present invention, a method for archiving and retrieving files on an archival system includes receiving predefined QoS levels and Uniform Resource Name (URN) associated with each file from the user; calculating the number of parity chunks fragmented from inputted files; generating a Uniform Resource Name (URN) for each data chunk and parity chunk and utilizing a hash function for either mapping the said chunks to storage nodes during file storage or determining the location of mapped chunks during file retrieval; creating the metadata associated with data chunks and parity chunks for storage in metadata server and a subset in headers of each chunk stored in storage nodes; and retrieving at least one file by inputting the Uniform Resource Name (URN) associated with the file by requiring the system to locate a minimum number of chunks consisting of a combination of data and parity chunks from the cluster of storage nodes and reconstruct the said file.

In an alternate exemplary embodiment of the present invention, a QoS driven archival storage and retrieval system includes an input means receiving at least one user defined QoS levels associated with each file; a processing unit embedded with a scheduler for encoding, decoding and mapping of data chunks and parity chunks; a storage node for storage of data chunks and parity chunks utilizing a cryptographic hash function for generating file and chunk checksums for maintaining data integrity; one or more metadata storage server utilizing a hybrid approach for storage of metadata and usable to reconstruct the original file; and a monitoring engine to track the status of lost or unavailable file chunks stored on any one of the several storage nodes for their participation in input/output operations performed on the system and regeneration mechanism of the said lost chunks to enhance system throughput against node failures.

In an alternate exemplary embodiment of the present invention, an automated regeneration mechanism for rebuilding the lost or dead storage nodes is provided that facilitates optimizing read bandwidth occupancy of the storage nodes by identifying the list of lost chunks to be regenerated and prioritizing them based on the QoS level associated with each file; identifying the number of active data chunks required for performing the reconstruction operation; moving the regenerated file chunks for storage on separate storage nodes; and transmitting the updated status of active file chunks to the monitoring engine for managing the entire regeneration process to exploit parallelism and improve upon the time required for node regeneration or rebuilding.

In another exemplary embodiment of the present invention a method for metadata reconstruction in a storage and retrieval system is presented which is initiated whenever there is a loss of central metadata. A request is sent to all storage nodes to do a complete scan of all chunks stored in the node and send the metadata stored in the chunk headers to the reconstruction process. Once all nodes have completed sending their reports, the database is scanned, validated and merged and a copy of the central metadata store is created.

These and other features and advantages will become apparent from the following detailed description of illustrative embodiments thereof, which is to be read in connection with the accompanying drawings.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention provides a Quality of Service (QoS) driven disk based storage system that enables long term file storage for archival purposes. In the following description, numerous specific details are set forth in order to provide a thorough understanding of the invention.

Various access patterns and workload pattern followed with the archival system are:

Write once-read few—Files are added once to the archive. The requirement to read it back is only occasionally. Most of the files added to the archive will not be read back except for integrity checking and restoration following a node failure.

Single client—A given file will be added by one client only and is not expected to be read concurrently by more than one client.

No updates—File once added to the archive will never be updated.

No deletes—Files will never be deleted from the archive.

Sequential reads of complete files—Files will never be ready partially. No blocks within a given file will be randomly accessed. When a file is read the complete file will be accessed by the client.

Figure 1:
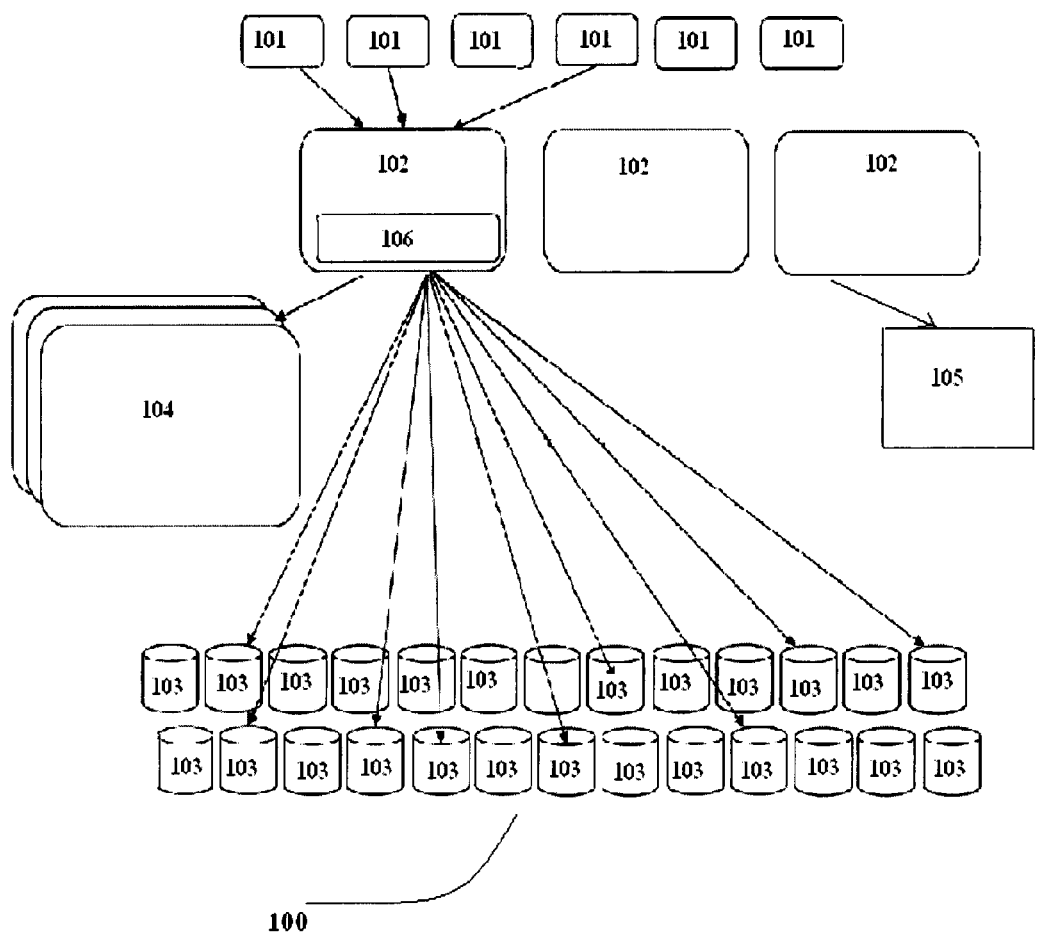
FIG. 1 is a block diagram of archival storage system 100 in accordance with one exemplary embodiment of the present invention.

FIG. 1 is a block diagram illustrating archival storage system architecture 100 comprising of the following components, discussed herein detail.

User/Client: These are client applications that access the data stores through an input means 101 provided by front end nodes. The client application has access to interfaces like put, get, list, search and delete operations for performing multiple input/output (I/O) operations. I/O may comprise any system for exchanging information to/from an external resource. The input means 101 may comprise any computer program running on a computer that is connected to the Front End Nodes via network and said program invokes the services offered by the Front End Nodes using predefined Application Program Interfaces (APIS).

Front End Nodes: Front End Nodes 102 is the processing unit of the archival storage system 100 where the main erasure coding operations are executed. Each front end node encodes/decodes the data and puts/gets it to/from the storage nodes depending on the actual location of the encoded fragments. These nodes have CPU and memory intensive workload. The front end nodes 102 are stateless servers and a load balancer can be used to distribute the load horizontally across a cluster of front end nodes 102. In particular, these front end nodes 102 are responsible for encoding, decoding and mapping of data objects to storage nodes. They provide client/user access interface and uses storage node/server interfaces to perform /get/delete data operation. Various I/O services supported by the archival system are put, get, list, search and delete operations on files and performed by the Front End nodes are Read, Write, List and Search operations.

An erasure coded file can be reconstructed from any k of (m+k) fragments, where k is the number of data chunks and m is the number of parity chunks created using an erasure coding technique. The Front End Nodes are configured to fragment and erasure encode the file using a suitable erasure encoding technique. With an erasure-coded redundancy scheme, each file is divided into k chunk and generates m parity chunks which are stored separately on storage nodes, where typically k>m. In the archival storage system, k storage holds data chunks and m other storage holds parity chunks for any given file. Erasure coding enables the archival storage system to tolerate the loss of any m storage nodes. Decoding takes a subset of cardinality k of the collection of (k+m) total storage nodes and from chunks stored in these k nodes reconstructs the original file data. The fraction r=k/n is called the code rate where n=k+m.

In a given embodiment, Maximum Distance Separable (MDS) codes such as Reed-Solomon codes may be used for the archival storage. Use of MDS codes gives maximum protection with guaranteed recoveries even if m nodes fail in an archival system with k+m nodes.

The present system 100, in particular, employs a QoS driven archival storage and retrieval of files. Each file stored in the archival storage has a desired QoS level associated with it. The desired QoS level associated with the file specifies the following two parameters—

Desired number of parity chunks—$m_d$

At any point of time there must be a minimum number of chunks that must be available in the system. If k is the number of data chunks, we must have $k+m_{min}$ chunks available at any point of time. Therefore the second parameter associated with a QoS level is $m_{min}$.

The relation $m_{min} < m_d <= N-k$, where N is number of storage nodes in the cluster is established for archival storage and retrieval flow throughout the life span of the file.

The archival storage system 100 will ensure that at no point of time the total number of available chunks for any file comes below the level $k+m_{min}$. When files are initially stored, the archival storage system creates $k+m_d$ number of chunks and puts them in $k+m_d$ different nodes in the cluster.

The QoS parameter is used primarily for:

Prioritizing the regeneration of lost chunks based on the desired QoS level,

Regeneration of lost chunks by use of a lazy approach i.e. the chunk regeneration can be delayed as long as the minimum number of available chunks is greater than $k+m_{min}$. The lazy approach allows regeneration to be scheduled during periods of low I/O activity.

For each QoS level j, there exist two parameters namely $m_{minj}$ and $m_{dj}$. For each file in the archival storage system 100, the associated QoS level determines the initial number of parity chunks that must be created and the minimum number of all chunks that must be available at any point of time, as discussed. Since each chunk is stored in a separate node, the QoS level translates into the minimum number of storage nodes containing that file's chunks that must be online and functioning.

If the number of data chunks is k, and the associated QoS level for a file is j, then the total number of chunks created initially is $k+m_{dj}$ and the minimum number of nodes containing chunks that must be healthy is $k+m_{minj}$.

The QoS levels of individual files/data elements to be archived can be predefined by the client/user according to its importance or criticality. For example the mail file of a senior executive is more important than that of a junior executive and hence is given a higher QoS.

In a given implementation it is possible to fix the value k and just vary the value of m as per desired QoS level.

With the introduction of QoS framework:

a granular file level control on the level of protection given to a file with respect to data loss due to hardware failure is allowed.

overall performance of the storage is improved, makes it more responsive, available and tolerant to hardware failures while maintaining the desired level of protection.

Storage Nodes:

The file chunks produced after erasure encoding of the data are stored in the storage nodes 103. Storage Nodes 103 handles the disk I/O intensive workload. In a given embodiment of this invention, Storage Nodes 103 may be realized using low cost commodity servers with direct attached disks or network attached disks. In another embodiment this may be realized using virtual machines with virtual disks. In yet another embodiment a program that accesses a cloud storage service such as Amazon S3 may act as storage node.

Storage Nodes 103 provide the following services to its authorized clients— a) Chunk Write—Given a file chunk and a chunk URN, the storage nodes 103 stores the chunk persistently and returns a status code. This is the most important function of a storage node.

b) Meta-data reports—Given a file URN or search criteria such as date, it returns the metadata associated with the file or the set of files satisfying the criteria. These services are used for metadata regeneration in the centralized meta data servers.

c) Chunk Regeneration—Given a set of file chunk URNs, the storage node 103 can carry out chunk regeneration and store the regenerated chunk in an appropriate storage node in the cluster.

A given deployment of archival system 100 will consist of a predefined fixed number of storage nodes 103. The number of storage nodes 103 in the cluster should be equal to or more than max(k)+max(m), where k is the number of data chunks and m is the number of coded/parity chunks.

Metadata Storage Server:

Metadata operation essentially consists of a metadata lookup operation and metadata insertion operations by Front End Nodes 101 during list, search, regeneration and writes operations. The metadata server 104 is a central repository for the metadata of all the files stored in the archive. Metadata consists of the following information:

File name, file URN and file size. For example—file name mail01.dat can have a URN of the form urn:archive:2011;email;91529;june01;mail01.dat. The URN will be a unique identifier for a given file.

Desired QoS levels associated with individual files.

Number of data chunks and number of coded chunks (parity chunks). In a given implementation the number of data chunks can be fixed and the number of parity chunks as per the QoS level can be made variable. Therefore it is not desirable to maintain this information separately.

Mapping of individual file chunks to their storage node 103 along with their individual 256 bit checksum. Checksum is used to check data integrity of the file chunk. This may be generated using cryptographic hash function such as Secure Hash Algorithm-SHA 256. Checksum of the original file using a similar cryptographic hash function such as SHA 256.

Basic file level metadata such as file owner, creation date/time, access date/time, modified date/time.

Additional metadata which will help in searching/indexing may be optionally stored A hybrid approach is adopted for metadata storage in archival storage system 100. In a given system implementation, metadata is stored in separate metadata servers and apart of the metadata is also stored as part of every file chunk stored in the storage nodes as well for following advantages:

a) The system 100 is not dependant on availability of the metadata for reading of files which improves the availability of the archival system.

b) Even in the event of complete loss of metadata in the metadata servers, it would be possible to read the files if file URN is known by the client. Also, since minimal metadata is available as part of file chunks, it would be possible to retrieve the files by scanning all the chunks in the storage nodes.

c) A part of central metadata like the QoS, file chunk URNs and storage node mapping, chunk and file checksums can be recovered using the metadata that are stored in the file chunks. The chunk URNs can be generated from file URN and QoS values stored in the chunk. From the chunk URNs the mapping of the chunk URNs and storage node can be created by using the hash based approach.

d) Since the metadata servers 104 is not accessed for file reading once the file URN is known, it reduces the workload on the metadata servers and thus prevents the metadata servers from being a bottleneck during file retrieval.

As indicated above, of the hybrid approach, while the complete metadata is stored in the metadata server 104, some parameters are also stored as part of each chunk in a chunk header of the storage node 103. These include—

File URN

Desired QoS level

File ownership data and creation time

Chunk checksum

Complete file checksum

Checksum of the header containing all of the above

The metadata in the central metadata server 104 is essentially used for all listing, searching and reconstruction operations only. For reading of files, there is no need to access the metadata server if the file URN is known since it would possible to locate the chunks of the files using the hashing approaches.

The central metadata is usually replicated on two or more servers. File I/O Services create and/or access metadata for each write, read, delete, list and search operation. Metadata will be additionally used for regeneration of lost files, reconstruction of failed nodes and during self-scrubbing by storage nodes 103.

Metadata Look Up Service:

This feature provided by the metadata storage server 104 is used by clients to access the metadata of a given file. The examples of metadata lookup are shown below:

Metadata for an individual file as identified by its URN—e.g metadata for file urn:archive:2011;email;91529;june01;mail01.dat Metadata of all files satisfying a given search criteria or pattern is exemplified as below:

return metadata of all files with QoS level "Class 1", return metadata of all files whose URN has the pattern "*email;91529;*"

return metadata of all files that have one chunk in "Node 10".

Metadata Storage Implementation:

Metadata storage in the central metadata servers can be implemented in multiple ways. Following are the key design criteria:

Metadata must be persisted and should be durable;

It should be designed for scalability of metadata operations—in terms of number of files stored, in terms of number of storage nodes and number of metadata operations per second and It should provide adequate performance for the type of queries propagated.

Various Metadata storage implementations are possible.

In one embodiment, the metadata is stored in the local file system of the metadata server. A hierarchical directory structure is created in the local file system which mirrors the implicit hierarchy in the file URNs. The metadata for a given archived file is stored in a file in the metadata server local file system in an appropriate directory. Say for example a file named mail01.dat is stored in the archive storage system with URN as urn:archive:2011;email;91529;june01; mail01.dat. In the metadata server 104 the metadata is stored in a file named mail01.dat in a directory named as /2011/emails/91529/june01. By storing the metadata in this manner helps searching the file metadata using the URN of the file only. The file system of the metadata server may be replicated on additional metadata servers for high availability and durability of metadata.

In another embodiment a relational database engine can be used for metadata storage. In yet another embodiment a memory resident metadata with a disk file as a backup for persistence can be employed.

Monitoring Engine:

The monitoring engine 105 is responsible for monitoring the health of the cluster, discovery of nodes joining and leaving the cluster and managing the chunk regeneration and node rebuild process. Storage nodes 103 may fail from time to time because of hardware or software failures in the storage nodes. Therefore the storage nodes can get disconnected from the cluster from time to time due to a variety of reasons. The Monitoring Engine 105 tracks cluster membership and the health of each node.

Figure 2:
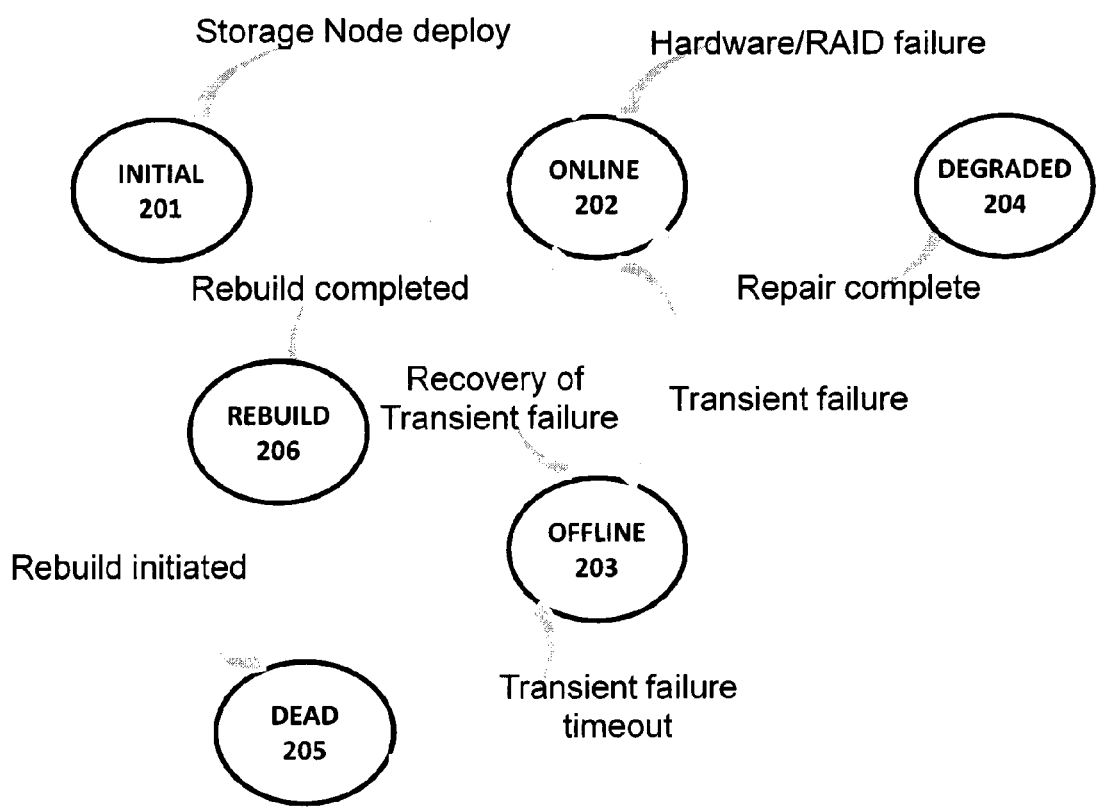
FIG. 2 shows the states of a typical storage node in accordance with one principle embodiment of the present invention.

The different possible states of the storage nodes 103 as reported and tracked by the monitoring engine is described in FIG. 2.

Accordingly referring to FIG. 2, Stage 201 or initial is the state of a storage node 103 before joining the storage archival system 100.

Stage 202 or online is the state when the storage node has joined and is ready to participate in data placement. A healthy fresh node is considered to be online when it is discovered by the monitoring engine 105 and the node list is updated with its information. A dead node once repaired moves to this state.

Stage 203 or Offline: Transient failures like network failure/maintenance activity can cause a storage node 103 to move to the offline state from online state for a certain period of time. Once the transient failures are rectified the storage node 103 will again come to stage 202.

Stage 204 or Degraded: Local disk failure can cause a storage node to change its state from online or offline to degrade. In this state the storage node 103 is running and but is undergoing regeneration. Once regeneration completes it returns to online state. Also when automated repair activities such as a RAID re-build is being carried out in a storage node 103 following a disk failure; the storage node is operating in a degraded state.

Stage 205 or Dead: A permanent hardware failure can cause a storage node 103 change its state to dead. When a node stays in an offline state for greater than a particular time limit, it is moved to the dead state. Once dead, the storage node 103 will require complete replacement and/or regeneration to initiate rebuild.

Stage 206 or Rebuild: A dead node may be replaced with a node and a rebuild operation can be initiated. On completion of node rebuild the storage node can become online.

The monitoring engine change state of a storage node 103 only if the storage node 103 remains in that state for a certain period of time. This eliminates rapid sate transitions due to the occurrence of transient failures in storage nodes.

Thus the monitoring engine monitors cluster activity and keeps track of all storage nodes state transitions. When any node moves to the dead state, the monitoring engine creates a priority list of all chunks that must be regenerated when a given dead storage node comes back online into the cluster. This priority list is dynamically updated depending on the status of the cluster nodes and the progress of the regeneration process.

I/O Scheduler:

It is important to achieve the best read performance when a given set of files needs to be retrieved from the archive. A given search or list operation returns a list of files that must be read from the archival storage system 100. In typical retrieval operations the number of files to be retrieved may be very large.

The archival storage system needs to intelligently issue I/Os to the various storage node 103 so as to achieve best performance given the fact that a given file can be restored from any k or the (k+m) storage nodes and some nodes may be in degraded or offline state. An intelligent I/O scheduler 106 is embedded into the processing unit 102 and it makes use of the information provided by the metadata server 104 and the Monitoring Engine 105. The approach is as follows The archival storage system allows files to be read and to be written even when some of the storage nodes are not healthy—i.e they are operating in states other than online or Stage 202. The I/O scheduler 106 checks for each file the best set of storage nodes 103 that must be accessed for file reading at that point of time. Before issuing read commands to the storage nodes, this optimum set is computed using node state information.

For a given file, if all k data chunks are in online nodes, then the scheduler 106 issues the I/O to data nodes only. This is because decoding of files when all data chunks are available consumes the least CPU cycles. Also, since file chunks are distributed across all nodes in the cluster using the hashing approach, the I/O load is fairly well distributed across all storage nodes. If all data nodes are not online, in that case the minimum number of parity chunks needed are accessed.

The I/O scheduling logic tries to avoid the I/O needed on degraded nodes. A specific case when a storage node is in degraded state 204 is when a RAID rebuild is in progress following a disk failure in the Storage Node 103. In such cases the RAID rebuild time will depend on how much of the Storage Node's resources are available for RAID rebuild. If the entire I/O and CPU resources are devoted for RAID rebuild, the rebuild will take much less time and the node will come out of the degraded quickly. By avoiding the I/O the I/O scheduler 106 helps in increasing the reliability and performance of the storage system 100.

While the above description, details the various components of the novel archival storage and retrieval system 100, emphasis here on will be laid upon the method of efficient storage and quick retrieval of the archived files for maximum throughput and improved performance.

In accordance with exemplary implementations of the present invention, a method for performing various operations is provided—Write, Read, List, Delete and Search by employing various system components as discussed below.

Figure 3:
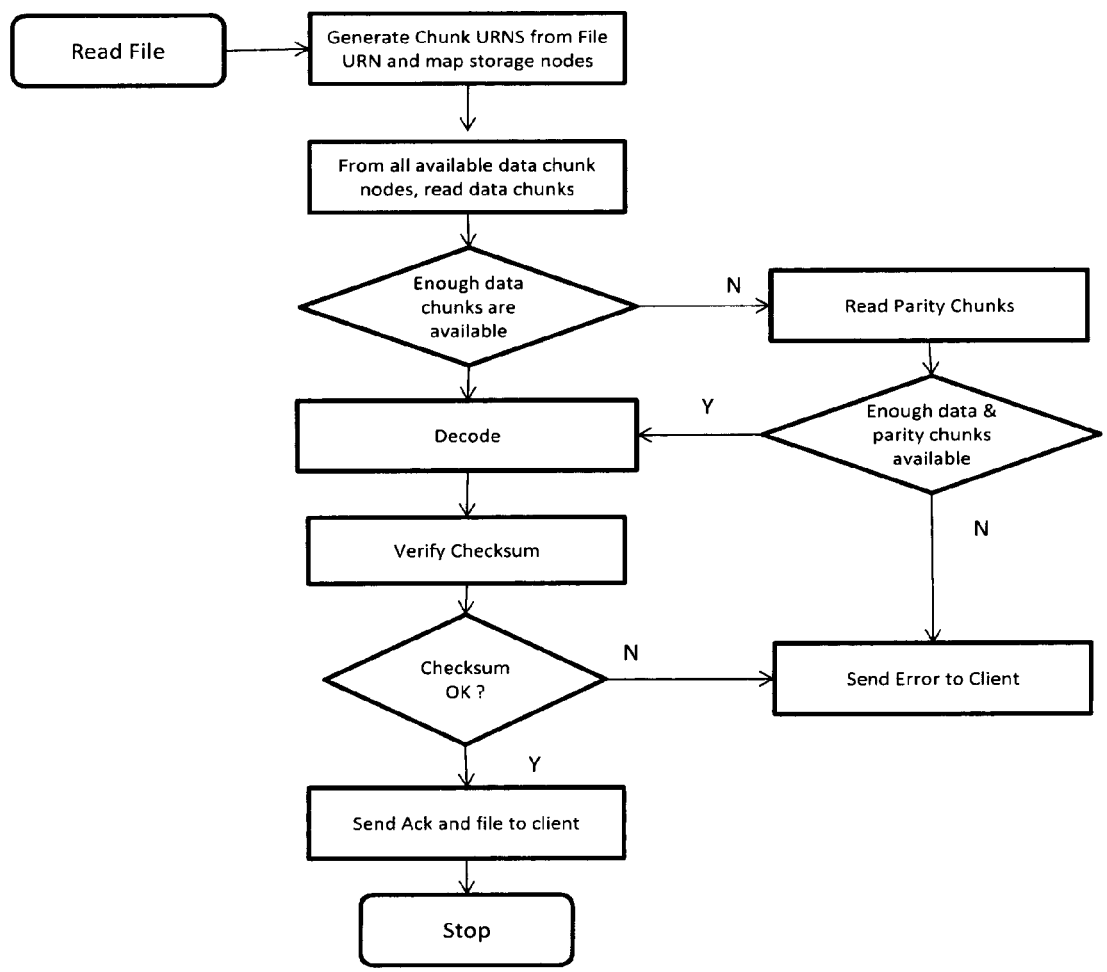
FIG. 3 represents the method of performing the write operation on the archival system according to one embodiment of the present invention.

Write Operation:

Client issues a write request using input means 101 along with the file URN, data, desired QoS and guaranteed QoS level. The front end server 102 will take the request and write the file in the archival system 100. The following steps are involved in the write process which is illustrated in FIG. 3:

a) Check for existence of the file URN in the archival system to avoid any duplication. This step involves a metadata lookup.
b) As discussed there will be fixed number of data chunks (k) for a given implementation and the number of parity chunks (m) will vary according to QoS level. So according to the supplied QoS value (desired one) the value of m is calculated. Since the archival storage system 100 is deployed in a controlled data center environment as opposed to a pure P2P system, it is reasonable to design the system considering a fixed number of nodes in any cluster. However because of nodes are inexpensive commodity servers, they are liable to fail and therefore because of any hardware or software failure the storage node may move to a degraded, offline or dead state.
c) Generate the chunk URNs from the file URN based on the value of k and m. This is required to identify the storage node to which a particular chunk will be written. The chunk URN generation involves the use a chunk name generator by the processing unit 102. The input to the chunk name generator is the file URN and the numbers (k, m), i.e the number of data chunks and number of parity chunks. Generating the chunk URNs can be as simple as appending the file URN by strings 'k:i' and 'm:j' for the ith data chunk and jth parity chunk respectively.

This can be well explained with the help of an example as follows—for file urn:archive:2011;email;91529; june01;mail01.dat, The URN of the 6th data chunk is urn:archive:2011;email;91529;june01;mail01.dat:k:6 and the URN for the 3rd parity chunk is urn:archive: 2011;email;91529;june01;mail01.dat:m:3.

d) Generate the hash of the chunk URNs and map those with the hash of the storage nodes 103 to get a mapping of the chunk URN to the storage node. The Monitoring Engine 105 reads a configuration file to build a list of storage nodes 103 and their IP addresses in the cluster. IP address/ Node Name of each storage node 103 is passed through a hash function to generate a node key and the node keys are arranged in form of an identifier circle.

File chunks are placed on nodes by comparing the hash of the file chunk URN with the storage node key and placing the file chunk on a node whose key is the successor of the file chunk key on the identifier circle, similar to the Chord distributed hash table protocol.

However, in the present system an intelligent file placement scheme is adopted which extends the Chord protocol by ensuring that no two chunks are placed on the same storage node. An initial chunk assignment is done similar to Chord and then all the nodes with two or more chunks are searched for. For all such nodes, the chunks are moved to those nodes where there are no file chunks. A search is executed sequentially from the current node and the first node that is unoccupied is identified. Thus, starting from the first node in the node identifier circle, the same sequential search is followed till all chunks are placed in different nodes. Once the file chunk placement is complete, metadata in the metadata server 104 is updated.

It is possible that the node selected by this scheme is unavailable at the time of writing. In such cases, the chunk writing is postponed till the node comes back online in stage 202. This approach can be adopted as long as the number of committed chunks are greater than or equal to a number as determined by the QoS level of that file. In case the number of chunk writes completed is less than this limit, an exception code is returned to the client/user.

e) Encode the file data and distribute the chunks among the online storage nodes 103. The encoding mechanism of the files inserted into the archival system 100 includes splitting the file into n (k+m=n) number of file chunks and stored in n different storage nodes 103. Here k of these data chunks are parts of the original file and m parity chunks are generated using an erasure coding technique such as Reed Solomon. Other coding schemes such as liberation, LDPC etc can also be used. The inputs required for encoding are:

number of slices (k,m) which depends on QoS level of the file.

packet size—each block is partitioned into strips with fixed size, denoted by packet size.

word size—a w-bit word, where w must be large enough that $n \leq 2w+1 \cdot w$ is typically constrained so that words fall on machine word boundaries: $w \in \{8, 16, 32, 64\}$.

buffer size—Since memory utilization is a concern, and since large files exceed the capacity of most computers' memories, encoder employs two fixed-size buffers, a Data Buffer partitioned into k blocks and a Coding Buffer partitioned into m blocks.

f) Insert the metadata in the metadata storage server 104, followed by writing in the central metadata server.
g) Finally, the guaranteed QoS levels are matched and if the response generated is positive, the writing operation gets terminated.

Figure 4:
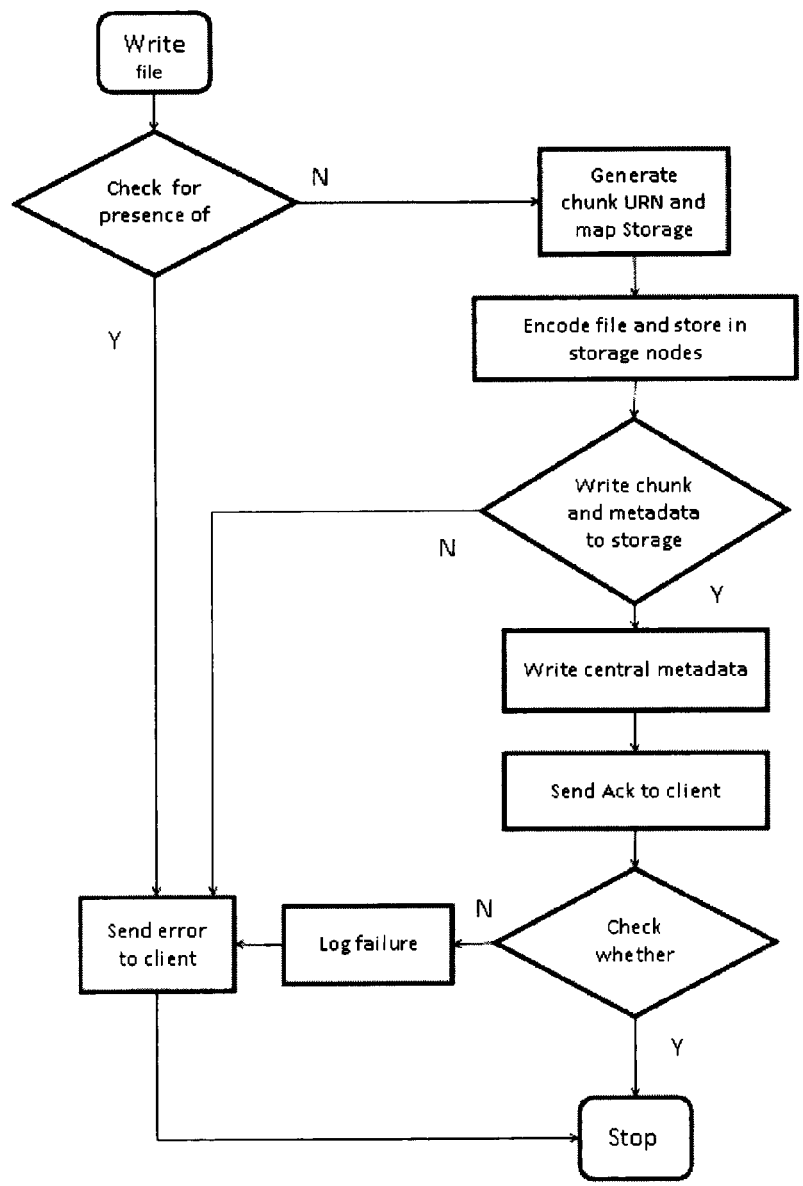
FIG. 4 represents the method of performing the read operation in accordance with one embodiment of the present invention.

Read Operation:

Read request is made by a client application with a file URN. File I/O decodes or reconstructs the file as shown in FIG. 4 and described below:

a) Generate the data chunk URNs from the given file URN while the value of k remains fixed for a given implementation. The data chunk URNs are hashed and mapped to the storage node 103.
b) The value of m depends on the QoS of the file which is stored in the header of each file chunk. QoS value from any data chunk is retrieved and then the coded chunk URNs based on the value of m are generated. The hash based approach is used to map the coded chunks to the storage nodes 103.
c) Now that the entire file chunk URNs and their mapping to respective storage nodes 103 are done, the processing unit 102 starts the decoding operation for reconstruction of the file which is executed in the steps of inputting the processing unit 102 with file URN. This step is executed if the number of data chunks available is sufficient; else parity chunks are read for subsequent decoding operation. The number of parity chunks (i.e. the value m) depends on the QOS level of the file and is available in the header of each file chunk. Using this data, the URNs of all the file chunks can be generated.

When a chunk is read from a storage node 103 it's the checksum of the chunk which gets generated and compared with the value stored in chunk header in order to ensure data integrity. The number of file chunks required for reconstruction depends on the coding scheme used and the file QoS. Once the original file is reconstructed the checksum of the decoded is validated against the value stored in metadata server 104.

d) The reconstructed file is thereafter returned to the client application.

List Operation

List operation is done by a metadata lookup operation. The central metadata server 104 is queried to provide a list of file URNs. Queries may be like—

Provide list of all URNs in storage node X.
Provide list of all URNs owned by Y.
Provide list of all URNs between dates, say 01-01-2011 and 31-12-2011.

Transaction Logs:

Further logs are generated for each write, read and regenerate transaction. These logs are used for debugging the archival system. Typically the transaction logs contain operation type, file name, operation start and end time, exit status etc. According to the type of operation (read, write, regenerate) there will be additional information like file URI written or read, the desired QoS level with which the file is written etc.

Self Scrubbing:

The checksum of the file and the chunks are saved as part of the central metadata 104. Individual file chunk checksums are also kept as part of each file chunk in the storage nodes 103. This is required to check and maintain the data integrity of the storage system 100. The checksum of individual chunks is validated by Self Scrubbing feature of the system. Checksums are also used by all read operations and regenerate operations.

Self-scrubbing is the process by which a storage node 103 does a periodic self data integrity check of the file chunks which are stored in it. Scrubbing periodically computes the checksum of the file chunks stored in the storage node 103 and compares the checksum with the checksum stored in the file header. Optionally the checksum can also be verified against the checksum stored in the central metadata server 104. A compromise of chunk integrity can be considered as lost file chunk event. In such scenario a notification is sent to the Monitoring Engine 105 about the lost file chunk. The regenerator records are updated for the bad file chunk and chunk regeneration is done once QoS of the file is breached Regeneration Module:

The archival system 100 is capable of maintaining availability and data integrity even after failures like Storage node failure leading to permanent loss of data stored in the storage node
Loss of chunk integrity due to silent data corruption in the storage nodes
Complete loss of metadata Apart from above failures, the archival system 100 also needs to accommodate retiring of old hardware and refreshing them with new hardware. This is especially important since archives may be needed to be maintained for many years and during this period storage node hardware would definitely have to be refreshed from time to time.

The system therefore needs to be self maintaining and self repairing. There are essentially two types of repair activities that are automatically initiated by the system. These are Node Rebuild—

Whenever a failed node is replaced or a storage node 103 is retired and refreshed with new hardware, a node rebuild operation is required.

Chunk Regeneration—

Chunks are lost when storage nodes 103 containing the chunks have failed. Chunks lose integrity when data corruption or bit rot causes the chunk to lose its integrity. In either case chunks need to be regenerated. All node rebuild operations include chunk regeneration as well. Chunk regeneration is also done when a chunk could not be written to its designated storage node because the node was not online when the file was added to the archive.

The two types of repair activities are discussed in detail hereon:

Node Rebuilding

The process of node rebuilding is controlled by the Monitoring Engine 105. Whenever a storage node 103 that was known to be in dead state 205 previously is detected as online 202 in the network by the Monitoring Engine 105 the node rebuild process is started. The various phases of the node rebuild process are as follows— a) Chunk List Generation—In this phase a complete scan of the metadata server 104 is performed to identify all chunks that must be stored in the node being rebuilt. This consists of simply reading the entire unique file URNs and their QoS value followed by the chunk placement computation scheme to compute the list of chunk URNs needed. This list is updated each time a node moves into the dead state.

b) Generation of Prioritized Queues—The list of chunk URNs are initially sorted on the basis of the QoS level. Then Monitoring Engine 105 further refines this priorities taking into consideration any change in state in the cluster and the impact of those changes in the number of available chunks. As stated, the system always tries to keep the number of available chunks greater than the minimum specified by the guaranteed QoS level.

c) Chunk Regeneration Dispatch and Scheduling—Once the prioritized queue is available the regeneration jobs must be assigned to nodes. Depending on the current state of the cluster, regeneration jobs are assigned to Front End Nodes 102 or Storage Nodes 103.

In an active cluster which is continuing to add new files in the archive, assigning the regeneration jobs to the front end nodes 102 is preferred. Such a cluster may have a large number of load balanced front end nodes 102 and for these nodes the process of regeneration simply adds to the existing file insertion workload.

In case of clusters that are simply storing old archives and no new insertions are taking place (this would be the case in long term archives whose storage capacities have been fully consumed), there may be no or few front end nodes 102. In that case the storage nodes 103 themselves can be used for rebuilding one of their peers. Moreover since there are a large number of storage nodes 103, a large number of chunks can be regenerated in parallel to reduce the node rebuild time.

d) Status Update—Whenever chunk regeneration is complete, the status is updated by the Monitoring Engine 105. When all chunks have been regenerated and the prioritized queue is empty, the node rebuild process completes.

Chunk Regeneration

To regenerate any file chunk the following I/O and compute tasks are needed—

1. Reading of any k number of chunks form their storage nodes 103.
2. Decoding the file using the above k chunks.
3. Re-encoding the file to generate the missing chunk.
4. Writing the regenerate chunk on the node being rebuilt.
5. Updating the status by sending a report to the Monitoring Engine 105.

Step 1 involves k read I/Os, Steps 2 and 3 involve CPU bound tasks, Step 4 involves a write operation and Step 5 involves sending a message to the Monitoring Engine 105.

The above mechanism of node regeneration is made more efficient and reliable by way of parallel regeneration process, discussed in detail as follows:

Parallel Regeneration

The main idea of parallel regeneration is to exploit parallelism and improve upon the time required for rebuilding a node. In an archive, any given storage node may contain around a very large number of file chunks.

With parallel regeneration all the regeneration tasks can be distributed to all healthy and online storage nodes 103 in the cluster. If a cluster has N nodes, and M files, and each file is broken down into (k+m) chunks, then any given storage node would have a maximum of M*(k+m)/N chunks. In case one storage node is being rebuilt, then the remaining (N−1) nodes can participate in the node rebuild process, each responsible for regeneration M*(k+m)/(N*(N−1)) chunks.

Since chunks are distributed all across the cluster, read I/O in Step 1 of regeneration is distributed across the (N−1) surviving nodes. Each of these (N−1) nodes would have to issue k*M*(k+m)/(N*(N−1)) reads. In turn each of the nodes would have to respond to k*M*(k+m)/(N*(N−1)) read requests.

Each of the nodes would have to execute M*(k+m)/(N*(N−1)) decode, re-encode and write operations.

The time required for complete node rebuild will be driven by the write bandwidth of the node being rebuilt. Since this rate, i.e rate at which Step 4 above is executed may be slower compared to the combined rate of Steps 1, 2 and 3, the (N−1) nodes involved in regeneration would have to store the regenerated chunks in a temporary staging area and send the chunks to the node being rebuilt on request.

The present invention in one of its preferred embodiment's attempts to balance the I/O load among the participating storage nodes as described.

Parallel Regeneration Scheduler

The parallel regeneration technique significantly improves upon the node rebuild time since rebuild time depends only on the write bandwidth of the node and this in any case is the best that can be achieved.

Parallel regeneration scheduling scheme tries to elect the optimum set of file chunks for each file being reconstructed and tries to balance the following using the I/O scheduler 106— a) It gives preference to data chunks in favor of parity chunks. This is because use of data chunks during file reconstruction uses the least number of CPU cycles
b) At the same time it tries to balance the read I/Os needed at each storage node. In case the I/O load on the nodes becomes unbalanced, it chooses an optimal combination data and parity chunks so as to avoid this unbalance and avoid creating I/O "hot spots".

In a storage cluster containing M nodes and out of which P nodes have failed we assume q number of file chunks need to be regenerated. The optimization of storage bandwidth is done as mentioned below:

To reconstruct a file any k chunks are required. Therefore, to regenerate q files the number of file chunks needed=kq.

Number of storage nodes participating in the regeneration process=M−P

The average size of each chunk=S MB,

Therefore, total read bandwidth required by the system=kqS MB.

The ratio of peak bandwidth and average bandwidth=1+$\epsilon$,

Thus, peak per node read bandwidth requirement=((1+$\epsilon$*kqS)/(M−P)

The scheduler 106 balances the read bandwidth per storage node 103 by minimizing the value of $\epsilon$. The best scenario is $\epsilon$=0 so that each storage node 103 reads kqS/(M−P) of data and writes kqS/(M−P) of data. Essentially the scheduler 106 divides the number of file chunks to be regenerated in such a way that all storage nodes get approximately same read bandwidth. In a given embodiment Linear Programming technique can be used for minimizing $\epsilon$.

Metadata Regeneration

The system 100 also has the capability to regenerate partial metadata of each file stored in the archive in case of loss of metadata stored in metadata servers 104. The metadata reconstruction is designed in such a way that that the most important metadata elements of all files stored in the archive can be restored even if there is a complete loss of central metadata.

On failure of the metadata server 104 all the insertion activities are stopped in the archival storage system 100. The highest priority is given to regeneration of the centralized metadata. Once the central metadata server is replaced the process of metadata reconstruction begins.

Broadly, when there is a loss of central metadata, a metadata reconstruction process is initiated in the Monitoring Engine 105. A request is sent to all storage nodes 103 to do a complete scan of all chunks stored in the node and send the metadata stored in the chunk headers to the reconstruction process. All these reports are stored in a database. Once all nodes have completed sending their reports, the database is scanned, validated and merged and a copy of the central metadata store is created. This database can be backed up and stored in an offline media.

The process for regeneration of metadata follows the series of steps as given:

For a given installation the number of data chunks (k) is fixed. So each file has a fixed set of data chunks. Say for example in a given installation k=10 and the file URN is archive:2011;email;91529;june01;mail01.dat, The URN of the 6th data chunk is urn:archive:2011;email;91529;june01;mail01.dat:k:6 and the URN for the 3rd data chunk is urn:archive:2011;email;91529;june01;mail01.dat:k:3.

Now the metadata server 104 send message to all storage nodes to send the metadata headers of all $k_i$ chunks, the initial value of which is set to 1 i.e the 1st data chunks of all files stored in the archival storage system 100. All the storage nodes 103 send the chunk header of all chunks corresponding to $ki=k_1$.

Once all the storage nodes 103 have responded the metadata server 104 compiles the responses and regenerates the metadata for all the files whose chunk header data has been reported. Also it builds a list ($db_i$) of all file whose chunk header is received. It is possible that some nodes are down and hence we would not receive any reports for all $k_i$ chunks stored in that node. So it is necessary to look for other chunks to restore the metadata. The metadata server replicates the list (dbi) across all the storage nodes.

Next, increment the value of i. The metadata server 104 send message to all storage nodes 103 to send metadata headers of all $k_i$ chunks of all files stored in the archival storage system 100, the file is not in list $\{db_i\}$. In other words headers of only those files are sent to metadata server 104 whose chunk headers have not been reported earlier. This reduces the I/O, network traffic and time required for metadata reconstruction.

Once all the storage nodes 103 responded the metadata server 104 compiles the responses and regenerates the metadata. Also it updates the $db_i$ with the newly received chunk headers.

Figure 5:
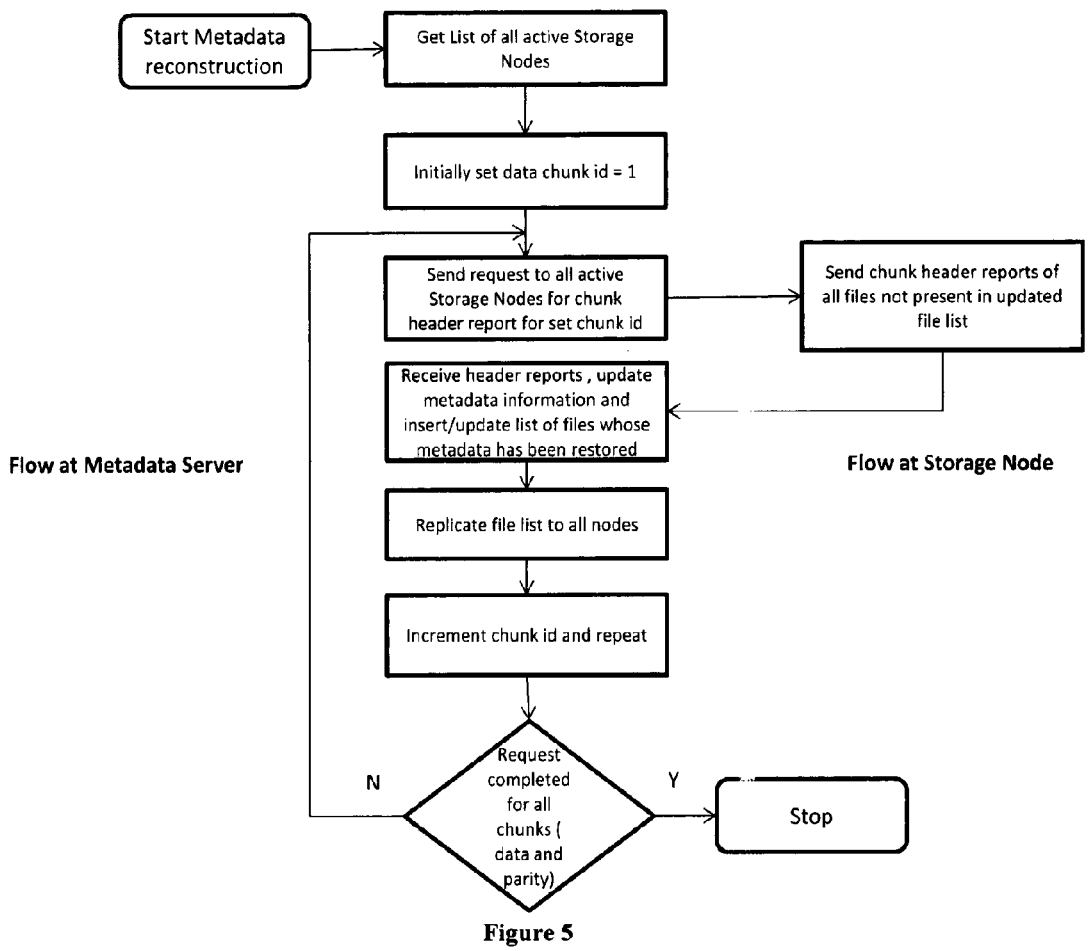
FIG. 5 illustrates the method of metadata reconstruction in the event of loss of central metadata in accordance with one exemplary embodiment of the present invention.

This process is repeated till i=k, i.e. for all data chunks as shown in FIG. 5. In such cases, where number of parity chunks is greater than data chunks, this procedure is repeated for the parity chunks as well.

Although the present invention has been shown and described with respect to several preferred embodiments thereof, various changes, omissions and additions to the form and detail thereof, may be made therein, without departing from the spirit and scope of the invention.

We claim:

1. A file storage and retrieval system comprising:
a processing unit;
a plurality of storage nodes; and
a memory storing instructions, wherein the processing unit is configured to execute the instructions to:
receive a Quality of Service (QoS) levels and uniform resource name for a file enabling fine grained control over file availability stored across the plurality of storage nodes;
determine k data chunks and m parity chunks fragmented from file chunks by a file encoding and placement scheme wherein the QoS level associated with the each file specifies presence of desired number $m_d$ of parity chunks and ensures total number of available chunks for any file to be above $k+m_{min}$ chunks wherein $m_{min} < m_d$;
determine a file chunk Uniform Resource Name (URN) for the k data chunks and m parity chunks;
determine a hash for each of the file chunk URNs;
determine a node key for each of the plurality of storage nodes using a hash function; and
store the k data chunks and m parity chunks across the plurality of storage nodes based on the node keys and the hashs for the file chunks;
a monitoring engine to track the status of lost file chunks stored on any one of the storage nodes for their participation in input/output operations performed on the system and regeneration mechanism on the lost chunks wherein regeneration is delayed as long as minimum number of available chunks is greater than $k+m_{min}$.

2. The system of claim 1, wherein the file is fragmented into data chunks and parity chunks by erasure encoding technique, and wherein the data chunks and parity chunks are used to reconstruct the file during file retrieval.

3. The system of claim 1, wherein the QoS level is specified by number of parity chunks and a minimum number of chunks that must always be available in the system.

4. The system of claim 1, wherein the number of data chunks remains fixed for all files of the system while the number of parity chunks vary based on the QoS level.

5. The system of claim 1, wherein a load balancer distributes encoding and decoding load uniformly across of the plurality of front end nodes.

6. The system of claim 1, wherein storing the file chunks includes comparing the hash of a file chunk URN with a node key of a storage node for placing the file chunk on the storage node such that no two data chunks reside on the same storage node.

7. The system of claim 1, wherein the storage node includes at least one of a physical machine with direct attached disks, a physical machine with network attached disks, and virtual machines with virtual disks or a program that access a cloud storage device.

8. The system of claim 1, wherein the storage nodes are further configured to perform regeneration of lost file chunks for subsequent storage of regenerated chunks.

9. The system of claim 1, wherein metadata corresponding to the file chunks is stored in one or more metadata servers and at least a portion of the metadata is also stored in the file chunks.

10. The system of claim 9, wherein the metadata includes at least one of file URN, desired QoS level, object owner and its creation time, checksum of original file, fragmented chunks, and the chunk header.

11. The system of claim 9, wherein the metadata is used when performing a lookup operation for the files.

12. The system of claim 1, wherein hash values are used as a checksum for the data chunks and the parity chunks during retrieval and regeneration.

13. The system of claim 9, wherein the metadata is stored in a hierarchical directory structure in the metadata server.

14. The system of claim 1, wherein a status of the file chunks is reported or dynamically updated as active, inactive, degraded or dead to trigger subsequent regeneration mechanism.

* * * * *